United States Patent
Bai

(10) Patent No.: US 10,727,877 B2
(45) Date of Patent: *Jul. 28, 2020

(54) MULTIWAY SWITCH, RADIO FREQUENCY SYSTEM, AND WIRELESS COMMUNICATION DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 1 day.

This patent is subject to a terminal disclaimer.

(21) Appl. No.: 16/173,585

(22) Filed: Oct. 29, 2018

(65) Prior Publication Data

US 2019/0288719 A1 Sep. 19, 2019

(30) Foreign Application Priority Data

Mar. 16, 2018 (CN) .......................... 2018 1 0220942

(51) Int. Cl.
*H04B 1/00* (2006.01)
*H01Q 1/24* (2006.01)
(Continued)

(52) U.S. Cl.
CPC ........... *H04B 1/0064* (2013.01); *H01Q 1/243* (2013.01); *H04B 1/18* (2013.01); *H04B 1/401* (2013.01);
(Continued)

(58) Field of Classification Search
CPC .......... H04B 1/44; H04B 1/48; H04B 1/0064; H04B 1/401; H04B 1/18; H04B 7/0413;
(Continued)

(56) References Cited

U.S. PATENT DOCUMENTS 7,633,357 B2 12/2009 Hangai et al.
9,831,940 B2 11/2017 Patel et al.
(Continued)

FOREIGN PATENT DOCUMENTS

CN   101154978 A   4/2008
CN   101242213 A   8/2008
(Continued)

OTHER PUBLICATIONS

International search report issued in corresponding international application No. PCT/CN2018111029 dated Jan. 18, 2019.
(Continued)

*Primary Examiner* — Lee Nguyen

(57) ABSTRACT

A multiway switch, a radio frequency system, and a wireless communication device are provided. The multiway switch includes eight T ports and four P ports. The eight T ports include four first T ports and each of the four first T ports is coupled with all of the four P ports. The four first T ports support only a transmission function. The multiway switch is configured to be coupled with a radio frequency circuit and an antenna system of a wireless communication device operable in a dual-frequency dual-transmit mode, to implement a preset function of the wireless communication device. The antenna system includes four antennas corresponding to the four P ports. The preset function is a function of transmitting a sounding reference signal (SRS) through the four antennas in turn.

18 Claims, 11 Drawing Sheets

(51) Int. Cl.
  *H04B 1/18* (2006.01)
  *H04B 1/401* (2015.01)
  *H04B 1/44* (2006.01)
  *H04L 5/00* (2006.01)
  *H04L 25/02* (2006.01)
  *H01Q 1/28* (2006.01)

(52) U.S. Cl.
  CPC ............ *H04B 1/44* (2013.01); *H04L 5/0048* (2013.01); *H04L 25/0226* (2013.01)

(58) Field of Classification Search
  CPC .. H04B 7/0602; H04B 7/0802; H04Q 3/0004; H04L 25/0226
  USPC ...................................... 455/73–80
  See application file for complete search history.

(56) References Cited

U.S. PATENT DOCUMENTS

| | | | |
|---|---|---|---|
| 10,355,738 | B1 | 7/2019 | Bai |
| 10,389,401 | B1 | 8/2019 | Bai |
| 10,419,040 | B1 | 9/2019 | Bai |
| 10,554,244 | B2 * | 2/2020 | Bai ................ H04B 7/0602 |
| 2004/0214528 | A1 | 10/2004 | Khorram et al. |
| 2009/0054093 | A1 | 2/2009 | Kim et al. |
| 2013/0308554 | A1 | 11/2013 | Ngai et al. |
| 2014/0227982 | A1 | 8/2014 | Granger-Jones et al. |
| 2014/0293841 | A1 | 10/2014 | Rousu |
| 2017/0195004 | A1 | 7/2017 | Cheng et al. |
| 2017/0373368 | A1 | 12/2017 | Srirattana et al. |
| 2018/0152955 | A1 | 5/2018 | Park et al. |
| 2018/0205413 | A1 | 7/2018 | Patel et al. |
| 2019/0097715 | A1 * | 3/2019 | Maldonado ............. H03F 3/24 |
| 2019/0288714 | A1 | 9/2019 | Bai |
| 2019/0288716 | A1 | 9/2019 | Bai |
| 2019/0288719 | A1 | 9/2019 | Bai |
| 2019/0288720 | A1 | 9/2019 | Bai |
| 2019/0288735 | A1 | 9/2019 | Bai |

FOREIGN PATENT DOCUMENTS

| | | |
|---|---|---|
| CN | 101803229 A | 8/2010 |
| CN | 101814924 A | 8/2010 |
| CN | 101867402 A | 10/2010 |
| CN | 101895305 A | 11/2010 |
| CN | 202103661 U | 1/2012 |
| CN | 102544753 A | 7/2012 |
| CN | 102595514 A | 7/2012 |
| CN | 103905104 A | 7/2014 |
| CN | 105245295 A | 1/2016 |
| CN | 105281735 A | 1/2016 |
| CN | 105870588 A | 8/2016 |
| CN | 106533526 A | 3/2017 |
| CN | 106559277 A | 4/2017 |
| CN | 106685621 A | 5/2017 |
| CN | 106712795 A | 5/2017 |
| CN | 106788577 A | 5/2017 |
| CN | 107070485 A | 8/2017 |
| CN | 107171672 A | 9/2017 |
| CN | 108199730 A | 6/2018 |
| CN | 108390693 A | 8/2018 |
| CN | 108462497 A | 8/2018 |
| CN | 108462506 A | 8/2018 |
| CN | 108494413 A | 9/2018 |
| CN | 108512556 A | 9/2018 |
| CN | 108512567 A | 9/2018 |
| WO | 2012026601 A1 | 3/2012 |
| WO | 2014154062 A1 | 10/2014 |

OTHER PUBLICATIONS

Extended European search report issued in corresponding European application No. 18202827.4 dated May 28, 2019.
Gao Xiang et al, Multi-Switch for Antenna Selection in Massive MIMO, Dec. 6, 2015, sections I-III.B-III.C, figures 1, 2, 6.
Lemieux G et al, Generating Highly-Routable Sparse Crossbars for PLDS, Jan. 1, 2000, section 2, figure 1.
Extended European search report issued in corresponding European application No. 18203601.2 dated May 28, 2019.
International search report issued in corresponding international application No. PCT/CN2018/111028 dated Jan. 3, 2019.
First Office Action issued in corresponding CN application No. 201810220598.3 dated Jan. 13, 2020.
International search report issued in corresponding international application No. PCT/CN2018/104977 dated Dec. 20, 2018.

* cited by examiner

MULTIWAY SWITCH, RADIO FREQUENCY SYSTEM, AND WIRELESS COMMUNICATION DEVICE

CROSS-REFERENCE TO RELATED APPLICATION(S)

This application claims priority to Chinese Patent Application No. 201810220942.9, filed on Mar. 16, 2018, the entire disclosure of which is hereby incorporated by reference.

TECHNICAL FIELD

This disclosure relates to the field of mobile terminal technology, and particularly to a multiway switch, a radio frequency system, and a wireless communication device.

BACKGROUND

With the widespread use of wireless communication devices such as smart phones, the smart phone can support an increasing number of applications and is becoming more and more powerful. The smart phone is developing in a diversified and personalized way, becoming indispensable electronic products in users' life. In the fourth generation (4G) mobile communication system, the wireless communication device generally adopts a single-antenna or dual-antenna radio frequency (RF) system architecture. Currently, in a new radio (NR) system of the fifth generation (5G) mobile communication system, requirements on supporting a four-antenna RF system architecture are proposed.

SUMMARY

Implementations of the disclosure provide a multiway switch, a radio frequency system, and a wireless communication device.

According to a first aspect of implementations of the disclosure, a multiway switch is provided. The multiway switch includes eight T ports and four P ports. The eight T ports include four first T ports and each of the four first T ports is coupled with all of the four P ports. The four first T ports support only a transmission function.

The multiway switch is configured to be coupled with a radio frequency circuit and an antenna system of a wireless communication device operable in a dual-frequency dual-transmit mode, to implement a preset function of the wireless communication device. The antenna system includes four antennas corresponding to the four P ports. The preset function is a function of transmitting a sounding reference signal (SRS) through the four antennas in turn.

According to a second aspect of implementations of the disclosure, a radio frequency system is provided. The radio frequency system includes an antenna system, a radio frequency circuit, and a multiway switch coupled with the radio frequency circuit and the antenna system.

The multiway switch includes eight T ports and four P ports. The eight T ports include four first T ports and each of the four first T ports is coupled with all of the four P ports. The four first T ports support only a transmission function. The antenna system includes four antennas corresponding to the four P ports. The multiway switch is configured to implement a preset function of transmitting an SRS through the four antennas in turn.

According to a third aspect of implementations of the disclosure, a wireless communication device is provided.

The wireless communication device includes an antenna system, a radio frequency transceiver, a radio frequency circuit coupled with the radio frequency transceiver, and a multiway switch coupled with the radio frequency circuit and the antenna system.

The multiway switch includes eight T ports and four P ports. The antenna system includes four antennas corresponding to the four P ports. The eight T ports include four first T ports and four second T ports. Each of the four first T ports is coupled with all of the four P ports and the four first T ports support only a transmission function. The four second T ports are coupled with the four P ports in one-to-one correspondence and the four second T ports support only a reception function. Each of the four P ports is coupled with a corresponding antenna of the four antennas. The multiway switch is configured to support a preset function of transmitting an SRS through the four antennas in turn.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1:
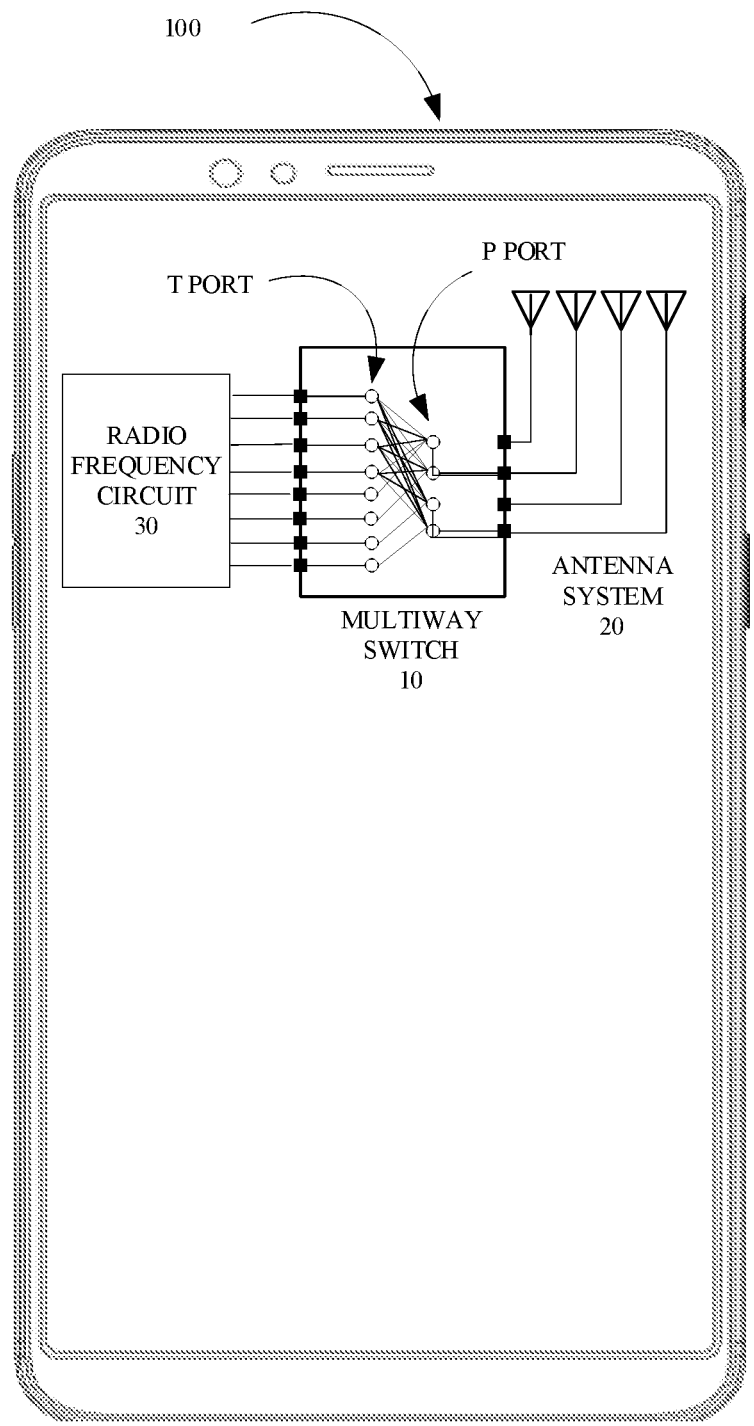
FIG. 1 is a schematic structural diagram illustrating a multiway switch according to an implementation of the disclosure.

Technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", "third", "fourth", and the like used in the specification, the claims, and the accompany drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can also be included.

The term "embodiment" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The wireless communication device involved in the implementations of the present disclosure may include terminal devices, base stations, and servers that have wireless communication functions. The wireless communication device may include at least one of handheld devices, in-vehicle devices, wearable devices (such as smart bracelets, smart watches, wearable glasses, wireless headsets), wireless charging receivers, computing devices or other processing devices connected to the wireless modem, as well as various forms of user equipments (UE), mobile stations (MS), terminal devices, and the like. For the convenience of description, the above-mentioned devices are collectively referred to as a wireless communication device.

The following describes some terms of the disclosure to facilitate understanding of those skilled in the art.

"P port" in the disclosure is the abbreviation of "pole port", which refers to ports coupled with antennas of the multiway switch. "T port" in the disclosure is the abbreviation of "throw port", which refers to ports coupled with radio frequency modules of the multiway switch. The multiway switch is a 3P3T switch for example. "Module" herein can refer to circuits and any combination of related components.

The concept of coupling, full coupling, or other kinds of coupling between the T ports and the P ports of the multiway switch described in the implementations of the disclosure refers to a state in which the T ports are coupled with the P ports through first switch transistors. One T port or one P port may be one port of a second switch transistor. The first switch transistors are configured to control a unidirectional conduction state between the T ports and the P ports (including a unidirectional conduction state from the T ports to the P ports and a unidirectional conduction state from the P ports to the T ports). The first switch transistor can be, for example, a switch array including three metal-oxide-semiconductor (MOS) transistors. When the first switch transistor is disconnected and not grounded, parasitic parameters will greatly affect performance of other connected ports. Therefore, the first switch transistor is implemented with three MOS transistors, where the three MOS transistors can be in a common source connection, that is, coupled at a common source. When the first switch transistor is disconnected, two MOS transistors at two ends are disconnected and one MOS transistor in the middle is grounded. The second switch transistor is configured to enable a corresponding port (T port or P port) and can be, for example, a MOS transistor. The specific configurations of the first switch transistor and the second switch transistor are not limited herein. As one implementation, the wireless communication device can control paths between the T ports and the P ports to switch on through the first switch transistors. As one implementation, the wireless communication device can be provided with a dedicated controller to be coupled with switch transistors of the multiway switch.

The transmitting a sounding reference signal (SRS) through the four antennas corresponding to the four P ports in turn refers to a process in which the wireless communication device interacts with a base station based on polling mechanism to determine quality of an uplink channel corresponding to each antenna.

At present, SRS transmission via four antennas switching of a mobile phone is a mandatory option for China mobile communications corporation (CMCC) in the China mobile fifth generation (5G) Scale Test Technical White Paper Terminal, which is optional in the 3rd generation partnership project (3GPP). Its main purpose is for a base station to determine quality and parameters of four channels via measuring uplink signals of the four antennas of the mobile phone, to perform a beamforming of a downlink massive multi-input multi-output (MIMO) antenna array on the four channels according to a channel reciprocity, and finally to obtain the best data transmission performance for a downlink 4×4 MIMO.

In order to satisfy requirements of SRS transmission via four antennas switching, implementations of the present disclosure provide a radio frequency architecture based on a simplified 4P8T antenna switch. Compared with a related 3P3T/DPDT/multiway small switch switching scheme, the present switching scheme can reduce the number of series switches in each path (all or part of switches are integrated into the 4P8T switch), thereby reducing link loss and optimizing the overall transmission and reception performance of the terminal. The implementations of the present disclosure are described in detail below.

FIG. 1 is a schematic structural diagram illustrating a multiway switch 10 according to an implementation of the disclosure. The multiway switch 10 includes eight T ports and four P ports. Four T ports of the eight T ports are coupled with all of the four P ports (that is, fully-coupled). The remaining four T ports are coupled with the four P ports in one-to-one correspondence, such that any two T ports of the remaining four T ports are coupled with different P ports. The multiway switch 10 is applicable to a wireless communication device 100. The wireless communication device 100 is operable in a dual-frequency dual-transmit mode and includes an antenna system 20 and a radio frequency circuit 30. The antenna system 20 includes four antennas. The four antennas correspond to the four P ports; specifically, the four antennas and the four P ports are in one-to-one correspondence.

The multiway switch 10 is configured to be coupled with the radio frequency circuit 30 and the antenna system 20 to implement a preset function of the wireless communication device 100. The preset function is a function of transmitting an SRS through the four antennas in turn, which can be understood as a four-port SRS function.

The wireless communication device may be a mobile phone or other terminal devices supporting the fifth generation new radio (5G NR), such as a customer premise equipment (CPE) or a mobile wireless-fidelity (MIFI).

The dual-frequency dual-transmit mode refers to an operating mode in which the wireless communication device can support dual frequency band-two uplink (UL) transmit paths or dual frequency band-four downlink (DL) receive paths.

The multiway switch 10 includes field-effect transistors (FET). As four T ports of the eight T ports are fully coupled with the four P ports and other T ports are only coupled with one fixed antenna for receiving, the number of built-in FETs, volume, and cost of the 4P8T switch can be reduced and performance can be improved. Details will be described hereinafter.

Figure 2:
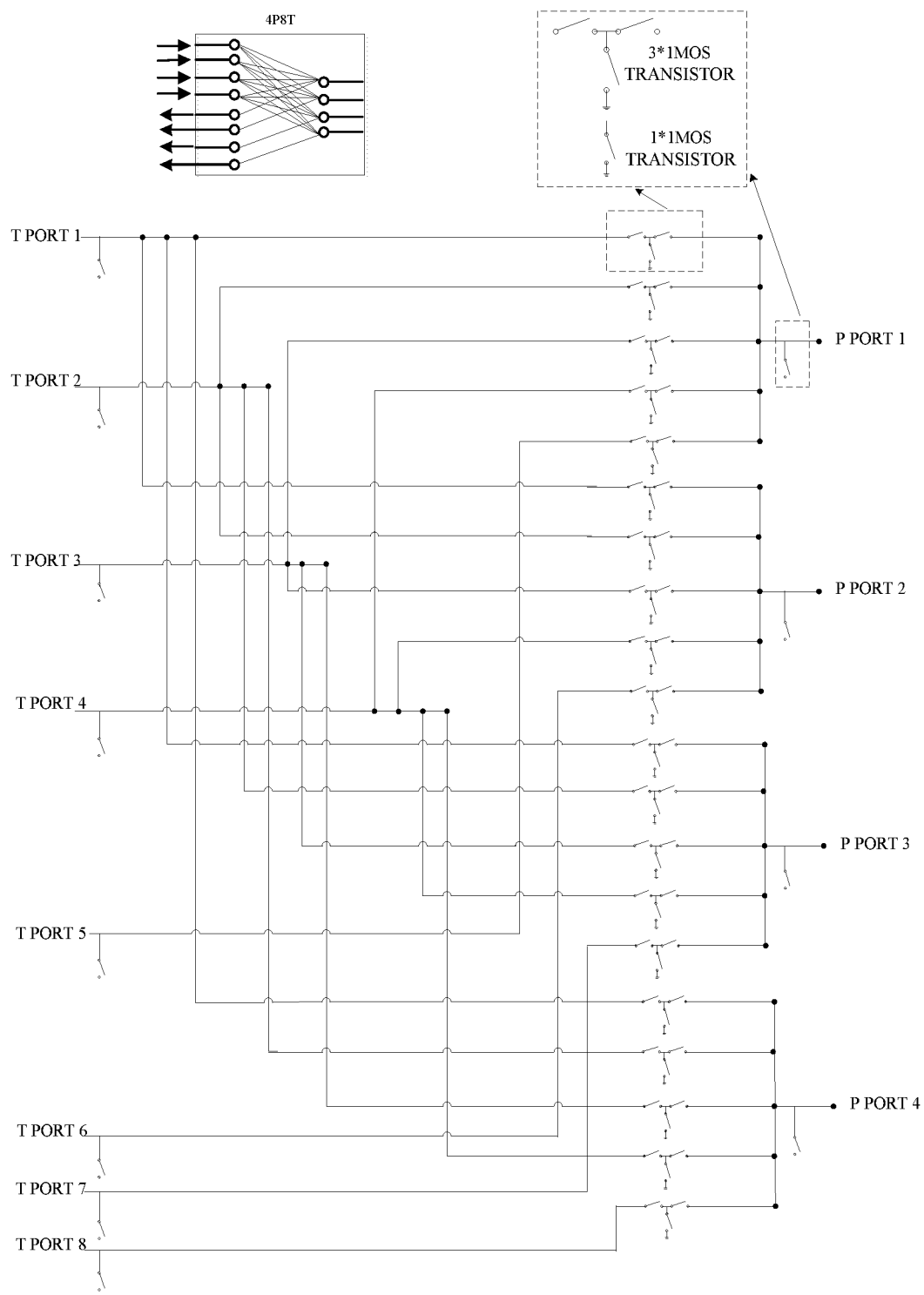
FIG. 2 is a schematic structural diagram illustrating a simplified 4P8T switch according to an implementation of the disclosure.

For example, in the case that the wireless communication device is operable in the dual-frequency dual-transmit mode, among the eight T ports, if each T port is fully coupled with the four P ports, the number of the field-effect transistors of the multiway switch 10 is 8+8*4*3+4=108; if four T ports are fully coupled with the four P ports, as illustrated in FIG. 2 of a schematic structural diagram of the multiway switch 10, the number of the field-effect transistors of the multiway switch 10 is 8+(4*4+(8−4)*1)*3+4=72.

By limiting the number of T ports that are fully coupled with the four P ports (in other words, fully coupled T ports), the number of switches of a radio frequency system of the wireless communication device can be effectively reduced. That is to say, the number of fully coupled T ports has a great influence on performance of the radio frequency system.

In addition, the wireless communication device 100 further includes a radio frequency transceiver. The radio frequency transceiver is coupled with the radio frequency circuit 30 and constitutes a radio frequency system of the wireless communication device 100 together with the radio frequency circuit 30, the multiway switch 10, and the antenna system 20.

According to the implementations of the disclosure, the multiway switch 10 is provided, which is applicable to the wireless communication device 100. The wireless communication device 100 is operable in the dual-frequency dual-transmit mode and includes the antenna system 20, the radio frequency circuit 30, and the multiway switch 10. The antenna system 20 includes the four antennas. The multiway switch 10 includes the eight T ports and the four P ports. Four T ports of the eight T ports are fully coupled with the four P ports. The multiway switch 10 is configured to be coupled with the radio frequency circuit 30 and the antenna system 20 to implement the preset function of the wireless communication device 100, and the preset function is a function of transmitting an SRS through the four antennas corresponding to the four P ports in turn.

As one implementation, the eight T ports include four first T ports and four second T ports. Each of the four first T ports is fully coupled with the four P ports. The four second T ports are coupled with the four P ports in one-to-one correspondence. The four first T ports support only the transmission function and the four second T ports support only a reception function.

In this implementation, since the multiway switch 10 includes the first T ports and the second T ports and the number of the second T ports is not 0, compared with a configuration in which all T ports are fully coupled with P ports, for the multiway switch 10 provided herein, the number of switches is reduced. That is, the number of the switches in transmit paths and/or receive paths of the radio frequency system of the wireless communication device 100 can be reduced, thereby reducing path loss, improving transmit power/sensitivity, data transmission rate in the 5G NR, and uplink and downlink coverage of the mobile phone, and reducing power consumption and cost.

In the case that the wireless communication device 100 is operable in the dual-frequency dual-transmit mode, the wireless communication device 100 logically includes eight receiver circuits (can be comprehended as a circuit for receiving and/or processing signals) and four transmitter circuits (can be comprehended as a circuit for transmitting and/or processing signals). The four transmitter circuits are divided into two groups of transmitter circuits. Each group of transmitter circuits includes two transmitter circuits that share a coupler. In addition, the two groups of transmitter circuits belong to two independent circuit modules respectively, in other words, each independent circuit module includes two transmitter circuits, that is, includes one group of transmitter circuits. Two transmitter circuits of any independent circuit module have two power amplifiers (PA) working at different frequency bands (one transmitter circuit has one power amplifier). Two transmitter circuits of any independent circuit module are coupled in one-to-one correspondence with two first ports of an independent circuit module to which the two transmitter circuits belong through a coupler. The two first ports are coupled in one-to-one correspondence with two first T ports that support only the transmission function of the four first T ports of the multiway switch 10. The eight receiver circuits are divided into four receiver integrated circuits (can be comprehended as an integrated circuit for receiving and/or processing signals) and each receiver integrated circuit includes two receiver circuits. In detail, two receiver circuits are integrated into one receiver integrated circuit through a switch. This receiver integrated circuit is coupled with one second port of an independent circuit module to which this group of receiver circuits belongs. Furthermore, the four receiver integrated circuits are respectively coupled with four second ports and each second port is coupled with one of the four second T ports of the multiway switch 10.

The specific configuration of the transmitter circuit and the receiver circuit, and definitions related to the multiway switch are similar to the foregoing implementations and will not be described herein again. In addition, it can be understood that, the matching manner of the above radio frequency circuit 30 and the multiway switch 10 includes but is not limited to the structure of the drawing, and is merely an example herein.

The multiway switch 10 of the implementation of the disclosure can enable the wireless communication device 100 to be operable in the dual-frequency dual-transmit mode. It is beneficial to simplifying the RF architecture of the wireless communication device supporting four-port SRS switching in the 5G NR, reducing the number of switches in transmit paths and receive paths, and reducing path loss, thereby improving transmit power/sensitivity, data transmission rate in the 5G NR, and uplink and downlink coverage of the mobile phone, and reducing power consumption.

Figure 3A:
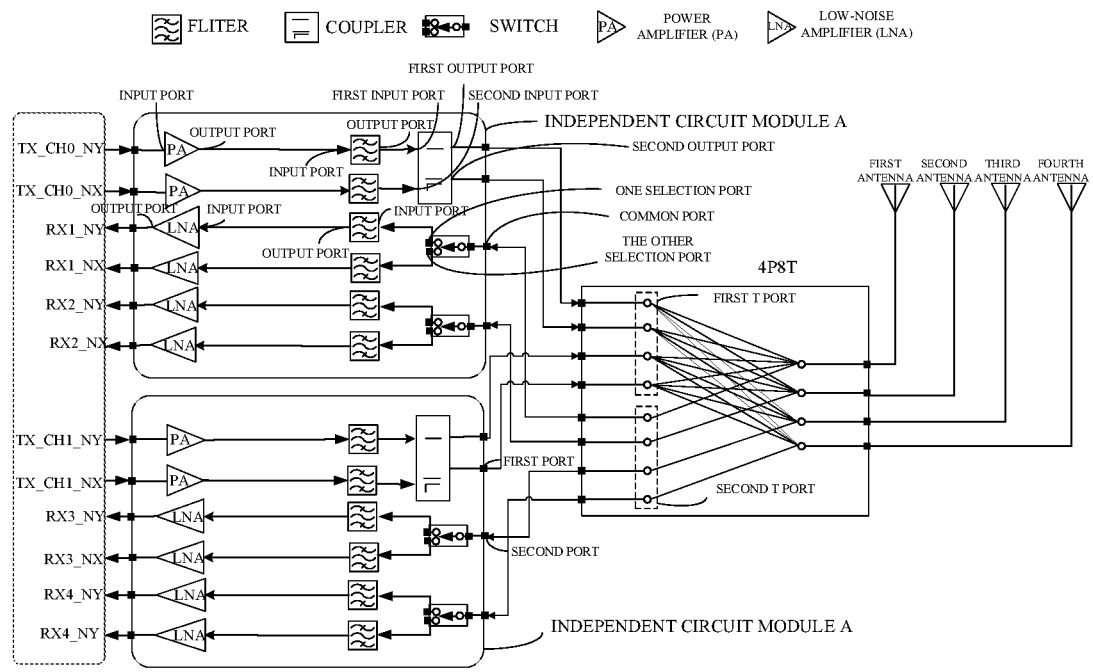
FIG. 3A is a schematic structural diagram illustrating a radio frequency circuit of a wireless communication device according to an implementation of the disclosure.

In one implementation, as illustrated in FIG. 3A, the radio frequency circuit 30 physically includes two independent circuit modules. The two independent circuit modules are two first independent circuit modules, where the first independent circuit module is embodied as independent circuit module A. The independent circuit module A includes two transmitter circuits and two receiver integrated circuits.

Figure 4:
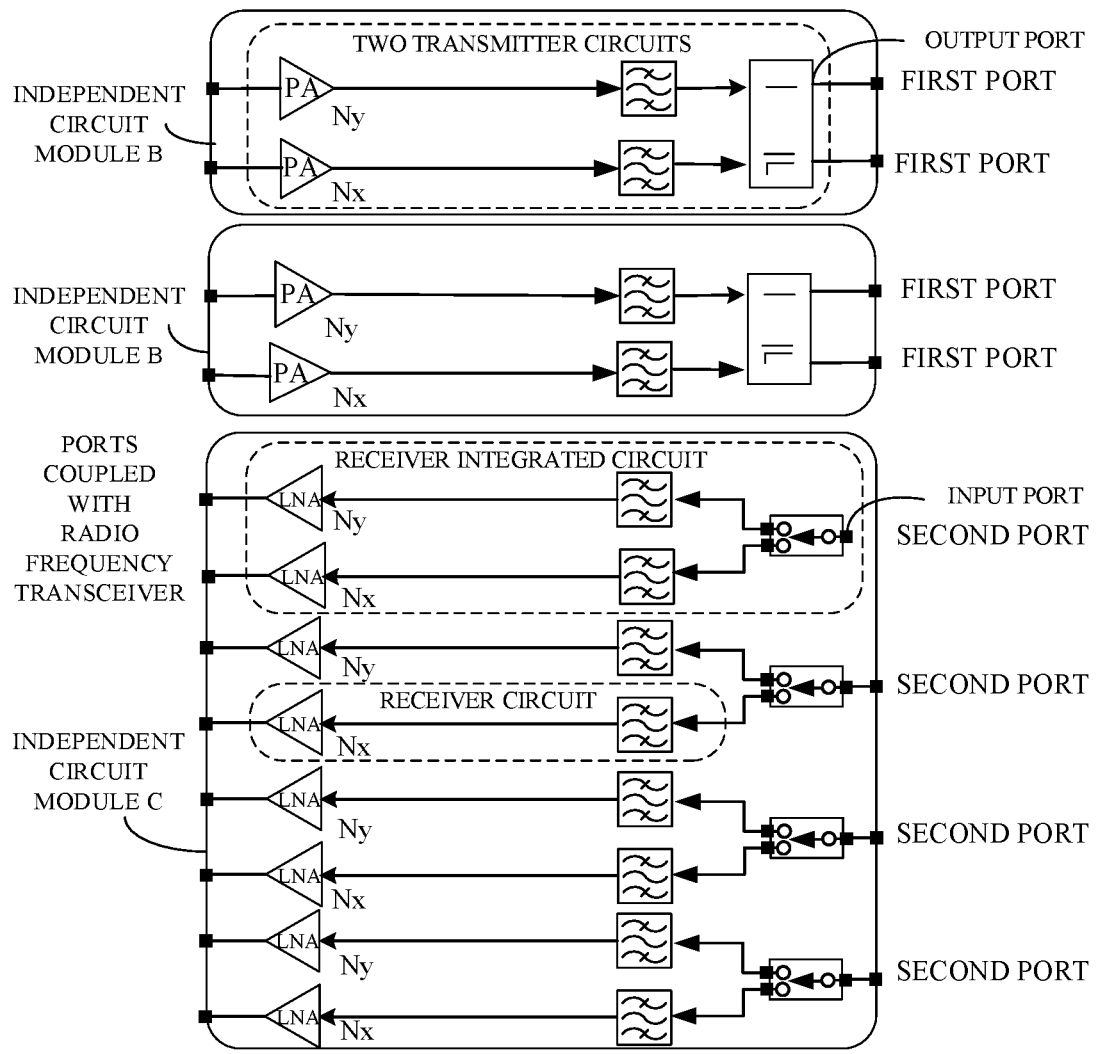
FIG. 4 is a schematic structural diagram illustrating another radio frequency circuit according to an implementation of the disclosure.

In one implementation, as illustrated in FIG. 4, the radio frequency circuit 30 physically includes three independent circuit modules. The three independent circuit modules include two first independent circuit modules and one second independent circuit module. In this implementation, the first independent circuit module is embodied as independent circuit module B and the second independent circuit module is embodied as independent circuit module C. The independent circuit module B includes two first ports. The independent circuit module C includes four second ports. Each first port is coupled with one of the four first T ports. Each second port is coupled with one of the four second T ports. The independent circuit module B includes two transmitter circuits. The independent circuit module C includes four receiver integrated circuits and each receiver integrated circuit includes two receiver circuits. Details will be described hereinafter.

Figure 5:
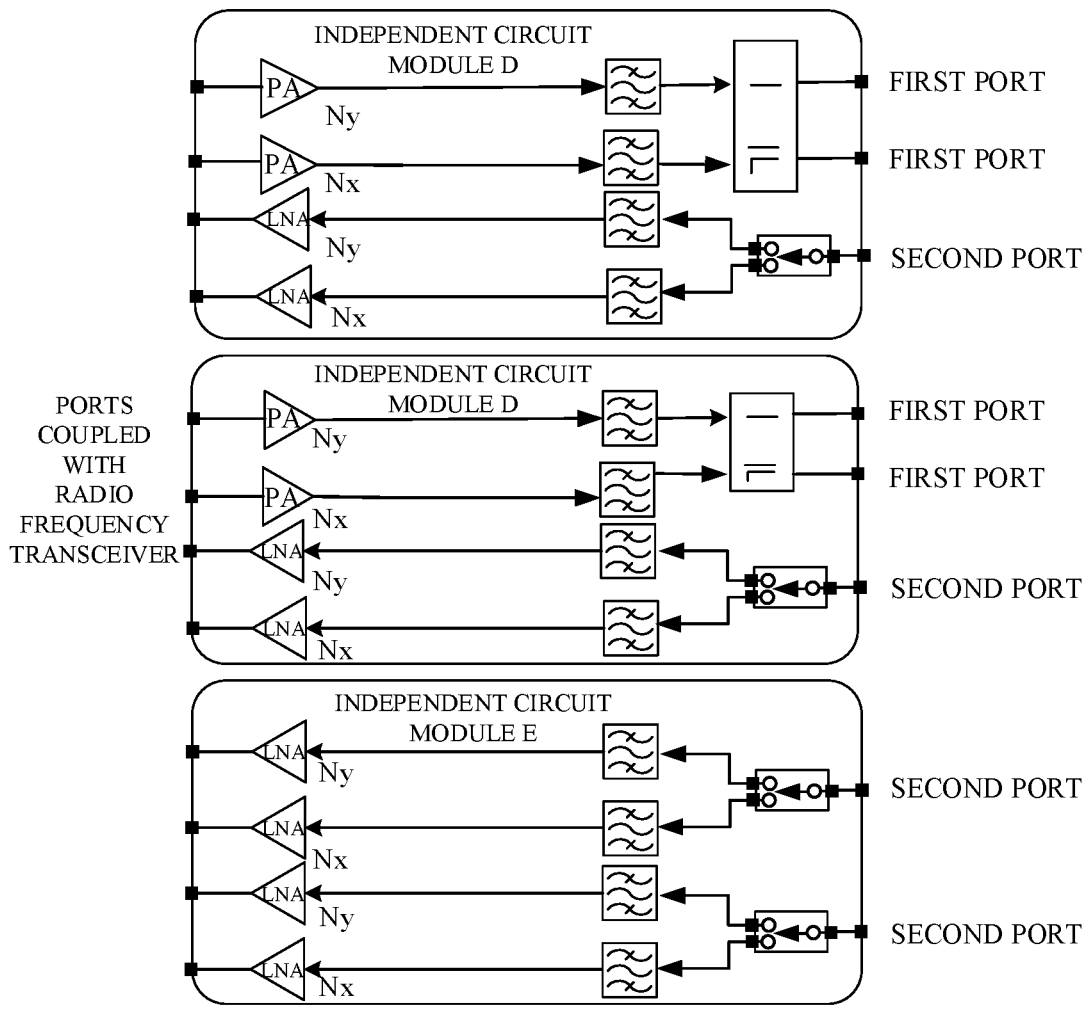
FIG. 5 is a schematic structural diagram illustrating yet another radio frequency circuit according to an implementation of the disclosure.

In one implementation, as illustrated in FIG. 5, the radio frequency circuit 30 physically includes three independent circuit modules. The three independent circuit modules include two first independent circuit modules and one second independent circuit module. In this implementation, the first independent circuit module is embodied as independent circuit module D and the second independent circuit module is embodied as independent circuit module E. The independent circuit module D includes two first ports and one second port. The independent circuit module E includes two second ports. Each first port is coupled with one of the four first T ports. Each second port is coupled with one of the four second T ports. The independent circuit module D includes two transmitter circuits and one receiver integrated circuit. The independent circuit module E includes two receiver integrated circuits. Each receiver integrated circuit includes two receiver circuits. Details will be described hereinafter.

Figure 6:
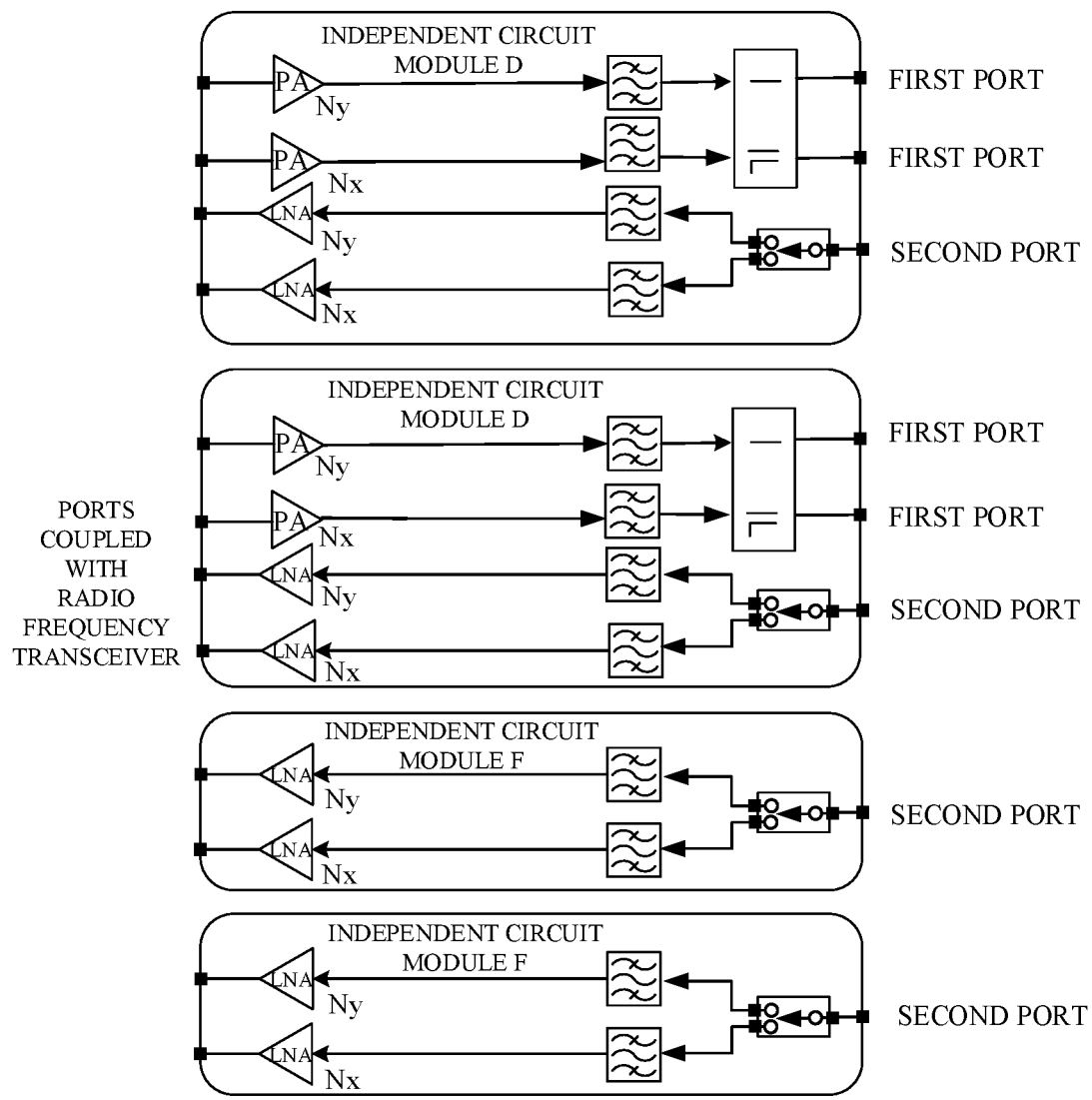
FIG. 6 is a schematic structural diagram illustrating still another radio frequency circuit according to an implementation of the disclosure.

In one implementation, as illustrated in FIG. 6, the radio frequency circuit 30 physically includes four independent circuit modules. The four independent circuit modules include two first independent circuit modules and two second independent circuit modules. In this implementation, the first independent circuit module is embodied as independent circuit module D and the second independent circuit module is embodied as independent circuit module F. The independent circuit module D includes two first ports and one second port. The independent circuit module F includes one second port. Each first port is coupled with one of the four first T ports. Each second port is coupled with one of the four second T ports. The independent circuit module D includes two transmitter circuits and one receiver integrated circuit. The independent circuit module F includes one receiver integrated circuit. The receiver integrated circuit includes two receiver circuits. Details will be described hereinafter.

Figure 7:
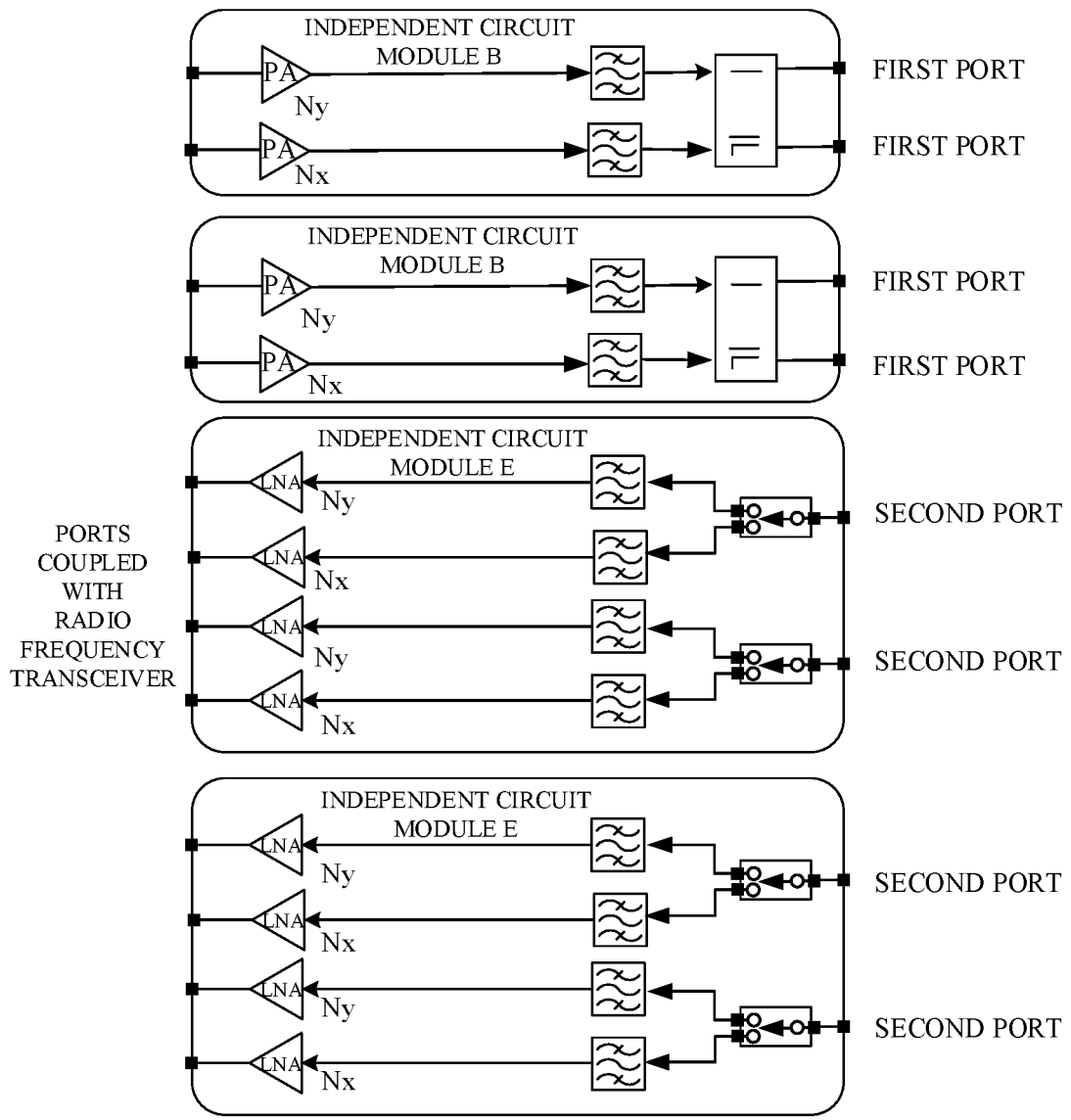
FIG. 7 is a schematic structural diagram illustrating still another radio frequency circuit according to an implementation of the disclosure.

In one implementation, as illustrated in FIG. 7, the radio frequency circuit 30 physically includes four independent circuit modules. The four independent circuit modules include two first independent circuit modules and two second independent circuit modules. In this implementation, the first independent circuit module is embodied as independent circuit module B and the second independent circuit module is embodied as independent circuit module E. The independent circuit module B includes two first ports. The independent circuit module E includes two second ports. Each first port is coupled with one of the four first T ports. Each second port is coupled with one of the four second T ports. The independent circuit module B includes two transmitter circuits. The independent circuit module E includes two receiver integrated circuits. Each receiver integrated circuit includes two receiver circuits. Details will be described hereinafter.

Figure 8:
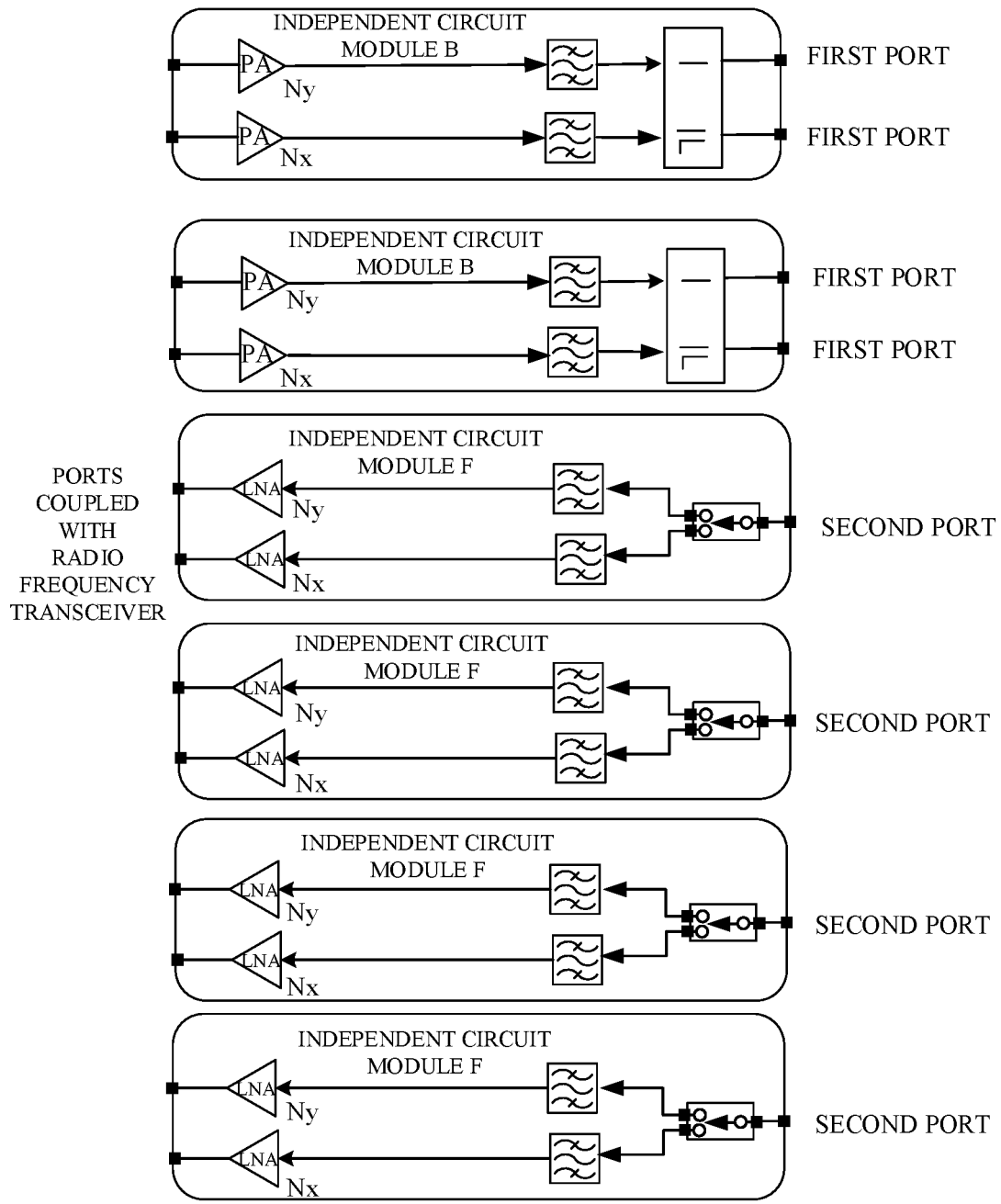
FIG. 8 is a schematic structural diagram illustrating still another radio frequency circuit according to an implementation of the disclosure.

In one implementation, as illustrated in FIG. 8, the radio frequency circuit 30 physically includes six independent circuit modules. The six independent circuit modules include two first independent circuit modules and four second independent circuit modules. In this implementation, the first independent circuit module is embodied as independent circuit module B and the second independent circuit module is embodied as independent circuit module F. The independent circuit module B includes two first ports. The independent circuit module F includes one second port. Each first port is coupled with one of the four first T ports. Each second port is coupled with one of the four second T ports. The independent circuit module B includes two transmitter circuits. The independent circuit module F includes one receiver integrated circuit. The receiver integrated circuit includes two receiver circuits. Details will be described hereinafter.

In the above implementations, two transmitter circuits are coupled in one-to-one correspondence with two first ports of an independent circuit module to which the two transmitter circuits belong. Each receiver integrated circuit is coupled with one second port of an independent circuit module to which this receiver integrated circuit belongs. In the case that an independent circuit module includes multiple receiver integrated circuits, the multiple receiver integrated circuits are coupled with second ports of the forgoing independent circuit module in one-to-one correspondence. It is noted that, the above expression of "each first port is coupled with one of the four first T ports" means that four first ports are coupled in one-to-one correspondence with four first T ports; similarly, the above expression of "each second port is coupled with one of the four second T ports" means that four second ports are coupled in one-to-one correspondence with four second T ports.

It can be understood that, the above-mentioned receiver circuits and transmitter circuits can be implemented in various manners. The implementations of the disclosure are not particularly restricted.

Hereinafter, each receiver integrated circuit and each group of transmitter circuits are described in detail. Each receiver integrated circuit includes two low-noise amplifiers (LNA), two filters, and one switch, where the two LNAs include a first LNA and a second LNA and the two filters include a first filter and a second filter. The switch has a common port coupled with one second port of an independent circuit module to which the receiver integrated circuit belongs. The switch has one selection port coupled with an input port of the first filter; the first filter has an output port coupled with an input port of the first LNA; and the first LNA has an output port coupled with a corresponding port of a radio frequency receiver. The switch has the other one selection port coupled with an input port of the second filter; the second filter has an output port coupled with an input port of the second LNA; and the second LNA has an output port coupled with a corresponding port of the radio frequency receiver. Each group of transmitter circuits includes two transmitter circuits. The two transmitter circuits include two power amplifiers (PA), two filters, and one coupler, where the two PAs include a first PA and a second PA and the two filters include a third filter and a fourth filter. The first PA has an input port coupled with a corresponding port of a radio frequency transmitter. The first PA has an output port coupled with an input port of the third filter; the third filter has an output port coupled with a first input port of the coupler; and the coupler has a first output port coupled with one first port of an independent circuit module to which the two transmitter circuits belong. It is to be noted that, the first input port of the coupler corresponds to the first output port of the coupler. The second PA has an input port coupled with a corresponding port of the radio frequency transmitter. The second PA has an output port coupled with an input port of the fourth filter; the fourth filter has an output port coupled with a second input port of the coupler; and the coupler has a second output port coupled with the other one first port of an independent circuit module to which the two transmitter circuits belong. It is to be noted that, the second input port of the coupler corresponds to the second output port of the coupler.

The following elaborates the case where the radio frequency circuit 30 physically includes two independent circuit modules.

As illustrated in FIG. 3A, the radio frequency circuit 30 includes two independent circuit modules A. The independent circuit module A includes two transmitter circuits and two receiver integrated circuits. The two transmitter circuits have two power amplifiers (PA) including a first PA and a second PA. The first PA has an input port coupled with a "TX_CH0_NY" pin (a first transmit port at the NY frequency band) and the second PA has an input port coupled with a "TX_CH0_NX" pin (a first transmit port at the NX frequency band) of a radio frequency transceiver. The first PA has an output port coupled with an input port of a first filter and the second PA has an output port coupled with an input port of a second filter. The first filter has an output port coupled with a first input port of a coupler and the second filter has an output port coupled with a second input port of the coupler. The coupler has a first output port coupled with one of two first ports of the independent circuit module A and a second output port coupled with the other one of the two first ports of the independent circuit module A. The two receiver integrated circuits have four low-noise amplifiers (LNA) (in which each receiver integrated circuit includes two LNAs) respectively coupled with "RX1-NY" pin (a first receive port at the NY frequency band), "RX1-NX" pin (a first receive port at the NX frequency band), "RX2-NY" pin (a second receive port at the NY frequency band), and "RX1-NX" pin (a second receive port at the NX frequency band) of the radio frequency transceiver. As mentioned above, the independent circuit module A includes two transmitter circuits and two receiver integrated circuits. The two transmitter circuits and the two receiver integrated circuits (the two receiver integrated circuits can be comprehended as four receiver circuits) are configured to be respectively coupled with "TX_CH1_NY" pin (a second transmit port at the NY frequency band), "TX_CH1_NX" pin (a second transmit port at the NX frequency band), "RX3-NY" pin (a third receive port at the NY frequency band), "RX3-NX" pin (a third receive port at the NX frequency band), "RX4-NY" pin (a fourth receive port at the NY frequency band), and "RX4-NX" pin (a fourth receive port at the NX frequency band) of the radio frequency transceiver. The internal coupling manner of the two transmitter circuits and the two receiver integrated circuits is similar with that of the independent circuit module A, and will not be described herein.

Figure 3B:
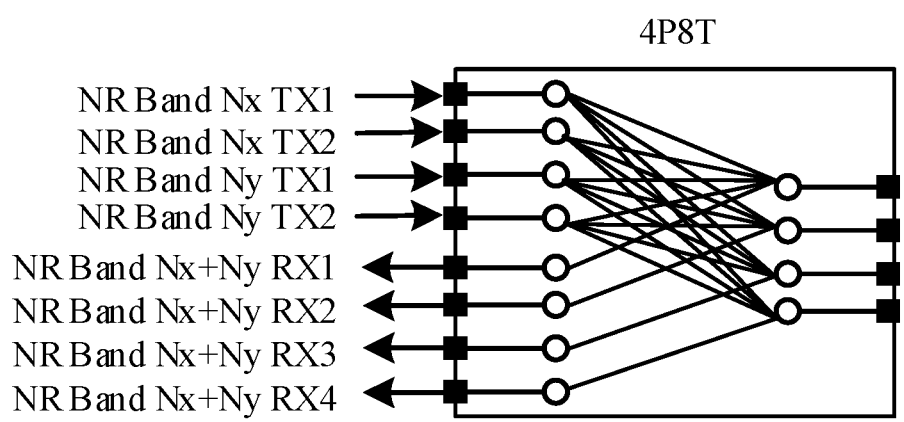
FIG. 3B is a schematic structural diagram illustrating a multiway switch according to an implementation of the disclosure.

Annotations of the multiway switch illustrated in FIG. 3B are described in detail hereinafter. "NR BAND NY TRX1" and "NR BAND NY TRX2" represent pins corresponding to two transmitter circuits at the NY frequency band. "NR BAND NX TRX1" and "NR BAND NX TRX2" represent pins corresponding to two transmitter circuits at the NX frequency band. "NR BAND NX+NY RX1" represents a pin corresponding to a first receiver integrated circuit at the NX frequency band and the NY frequency band. "NR BAND NX+NY RX2" represents a pin corresponding to a second receiver integrated circuit at the NX frequency band and the NY frequency band. "NR BAND NX+NY RX3" represents a pin corresponding to a third receiver integrated circuit at the NX frequency band and the NY frequency band. "NR BAND NX+NY RX4" represents a pin corresponding to a fourth receiver integrated circuit at the NX frequency band and the NY frequency band.

The coupling manners of the radio frequency transceiver, the radio frequency circuit 30, and the multiway switch 10 illustrated in FIGS. 4, 5, 6, 7, and 8 are similar as that of the radio frequency transceiver, the radio frequency circuit 30, and the multiway switch 10 illustrated in FIG. 3, and are not repeated herein.

The wireless communication device 100 can control paths between the T ports and the P ports of the multiway switch 10 to switch on through switch transistors to achieve the preset function of transmitting an SRS through the four antennas corresponding to the four P ports in turn by the wireless communication device 100.

In one possible implementation, the four antennas include a first antenna, a second antenna, a third antenna, and a fourth antenna. These four antennas are all operable at a fifth generation new radio (5G NR) frequency band.

The 5G NR frequency band may include, for example, 3.3 GHz to 3.8 GHz and 4.4 GHz to 5 GHz.

In one possible implementation, the four antennas include a first antenna, a second antenna, a third antenna, and a fourth antenna. The first antenna and the fourth antenna are antennas operable at a long term evolution (LTE) frequency band and a fifth generation new radio (5G NR) frequency band. The second antenna and the third antenna are antennas only operable at the 5G NR frequency band.

The first antenna and fourth antenna are intended to support DL 4×4 MIMO for some frequency bands in LTE on terminals. These two antennas are shared with the 5G NR (hereinafter, "shared antennas" for short). The LTE frequency band may include, for example, 1880-1920 MHz and 2496-2690 MHz.

Figure 9:
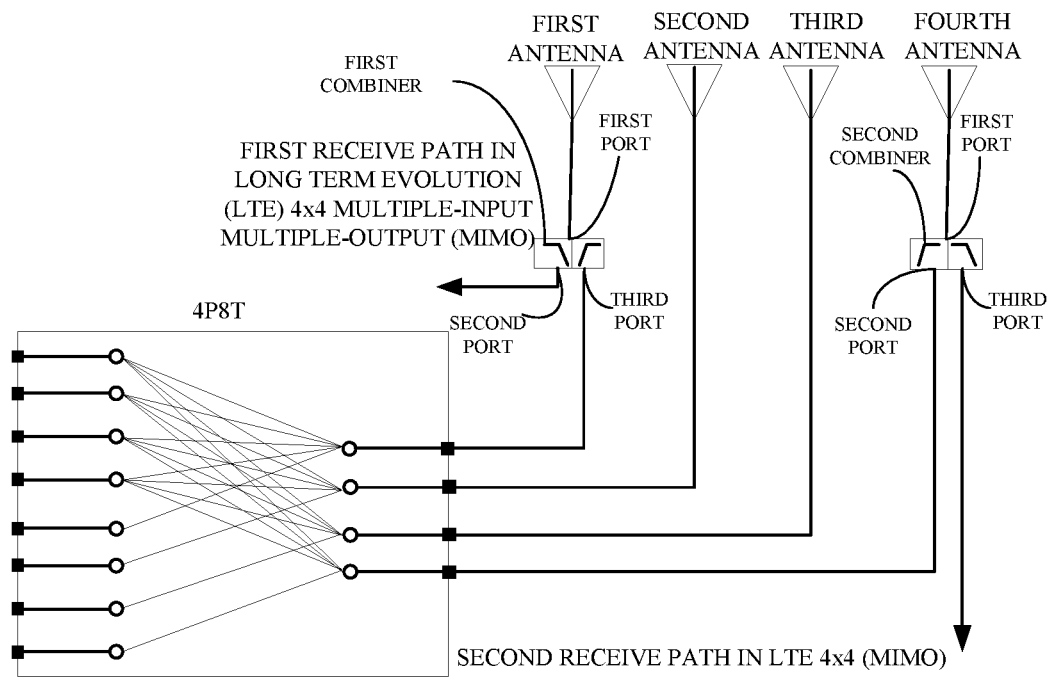
FIG. 9 is a schematic structural diagram illustrating an antenna system of a wireless communication device according to an implementation of the disclosure.

In one possible implementation, as illustrated in FIG. 9, the antenna system further includes a first combiner and a second combiner. The first combiner has a first port configured to be coupled with the first antenna, a second port configured to be coupled with a first receive path in LTE 4×4 multiple-input multiple-output (MIMO) configuration of the wireless communication device, and a third port configured to be coupled with a corresponding P port of the multiway switch. The second combiner has a first port configured to be coupled with the fourth antenna, a second port configured to be coupled with a second receive path in the LTE 4×4 MIMO configuration of the wireless communication device, and a third port configured to be coupled with a corresponding P port of the multiway switch.

The LTE 4*4 MIMO is a downlink LTE receive circuit and can be defined as a third receive path. Since the LTE currently has two receive paths, in order to support LTE 4×4 MIMO, the third path and a fourth receive path are added.

According to performance of the four antennas, the wireless communication device 100 will arrange one antenna with better performance for the circuit for PRX (primary receiver), and the antenna will be in a standby state. Moreover, first T ports of the switch having the transmission function can be configured for TX (transmit) purpose, and thus the antenna can be switched arbitrarily. In this way, there is no need to restrict the coupling between ports of shared antennas.

Figure 10:
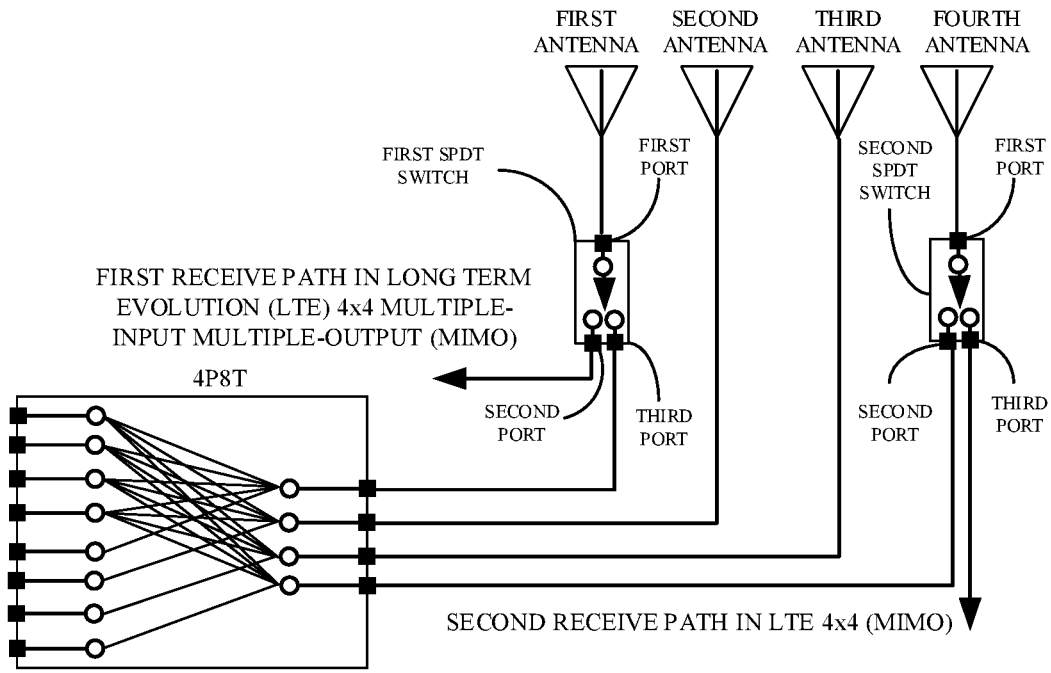
FIG. 10 is a schematic structural diagram illustrating another antenna system of a wireless communication device according to an implementation of the disclosure.

In one possible implementation, as illustrated in FIG. 10, the antenna system 20 further includes a first single-pole double-throw (SPDT) switch and a second SPDT switch. The first SPDT switch has a first port configured to be coupled with the first antenna, a second port configured to be coupled with a first receive path in LTE 4×4 multiple-input multiple-output (MIMO) of the wireless communication device 100, and a third port configured to be coupled with a corresponding P port of the multiway switch. The second SPDT switch has a first port configured to be coupled with the fourth antenna, a second port configured to be coupled with a second receive path in the LTE 4×4 MIMO of the wireless communication device 100, and a third port configured to be coupled with a corresponding P port of the multiway switch.

The schemes of the disclosure can be combined or replaced with each other. For example, the antenna system and/or the multiway switch described above can be applied or combined into the radio frequency system and the wireless communication device below. It is to be noted that, "the antenna system and/or the multiway switch" of the disclosure means "the antenna system", "the multiway switch", or "the antenna system and the multiway switch".

Figure 11:
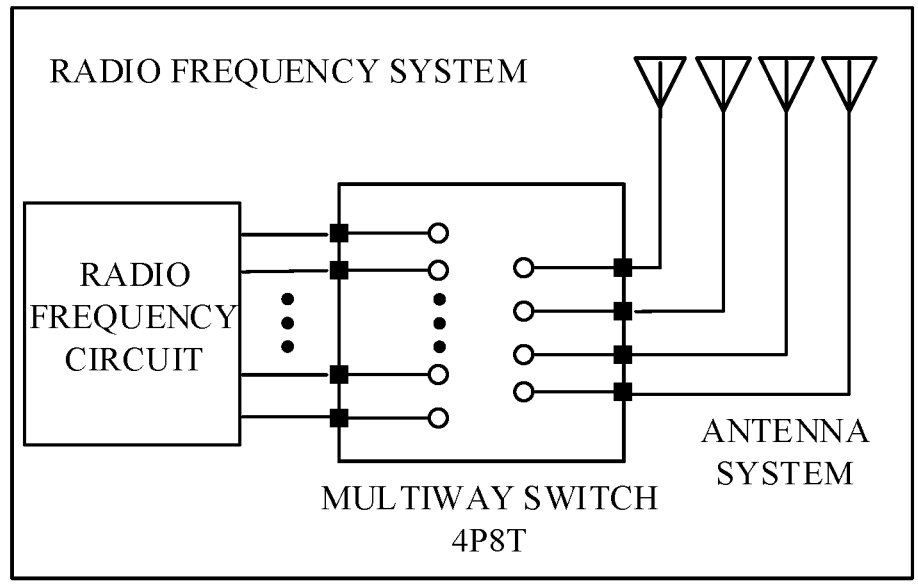
FIG. 11 is a schematic structural diagram illustrating a radio frequency system according to an implementation of the disclosure.

FIG. 11 is a schematic structural diagram illustrating a radio frequency system according to an implementation of the disclosure. The radio frequency system includes an antenna system, a radio frequency circuit, and a multiway switch coupled with the radio frequency circuit and the antenna system. The multiway switch includes eight T ports and four P ports. The eight T ports include four first T ports and each of the four first T ports is coupled with all of the four P ports. The four first T ports support only a transmission function. The antenna system includes four antennas corresponding to the four P ports. The multiway switch is configured to implement a preset function of transmitting an SRS through the four antennas in turn.

As one implementation, the eight T ports further include four second T ports. The four second T ports are coupled with the four P ports in one-to-one correspondence. Each of the four P ports is coupled with a corresponding antenna of the four antennas. The four second T ports support only a reception function.

As one implementation, the four antennas include a first antenna, a second antenna, a third antenna, and a fourth antenna. The first antenna and the fourth antenna are antennas operable at a long term evolution (LTE) frequency band and a fifth generation new radio (5G NR) frequency band. The second antenna and the third antenna are antennas only operable at the 5G NR frequency band.

As one implementation, with the above structure regarding to the four antennas, the antenna system further includes a first combiner and a second combiner. The first combiner has a first port coupled with the first antenna, a second port coupled with a first receive path in LTE 4×4 multiple-input multiple-output (MIMO) configuration of the wireless communication device, and a third port coupled with a corresponding P port of the multiway switch. The second combiner has a first port coupled with the fourth antenna, a second port coupled with a second receive path in the LTE 4×4 MIMO configuration of the wireless communication device, and a third port coupled with a corresponding P port of the multiway switch.

As one implementation, with the above structure regarding to the four antennas, the antenna system 20 further includes a first single-pole double-throw (SPDT) switch and a second SPDT switch. The first SPDT switch has a first port coupled with the first antenna, a second port coupled with a first receive path in LTE 4×4 MIMO configuration of the wireless communication device 100, and a third port coupled with a corresponding P port of the multiway switch. The second SPDT switch has a first port coupled with the fourth antenna, a second port coupled with a second receive path in the LTE 4×4 MIMO configuration of the wireless communication device 100, and a third port coupled with a corresponding P port of the multiway switch.

The definitions related to the radio frequency system illustrated in FIG. 11 are similar to the foregoing descriptions and are not described herein.

As can be seen, for the transmit paths and the receive paths of the radio frequency system of the wireless communication device, the transmit paths can include one single independent switch (a 4P8T switch) or two independent switches (a SPDT switch and a 4P8T switch), and the receive paths can include one single independent switch (a 4P8T switch) or two independent switches (a SPDT switch and a 4P8T switch). That is to say, by integrating more switch functions of the transmit paths and the receive paths of the radio frequency system into the 4P8T switch, the number of independent switches of the transmit paths and the receive paths can be effectively reduced.

Figure 12:
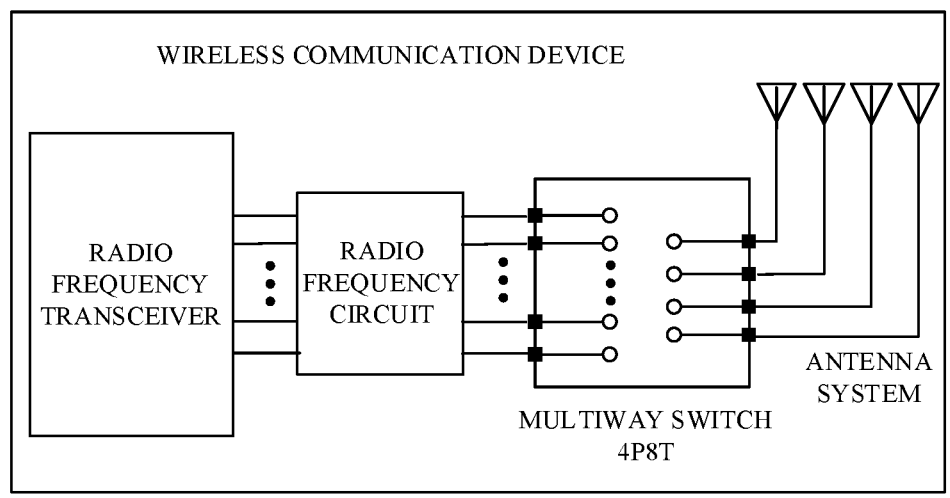
FIG. 12 is a schematic structural diagram illustrating a wireless communication device according to an implementation of the disclosure.

FIG. 12 is a schematic structural diagram illustrating a wireless communication device according to an implementation of the disclosure. The wireless communication device can be a mobile terminal, a base station, and the like, and includes an antenna system, a radio frequency transceiver, a radio frequency circuit coupled with the radio frequency transceiver, and the multiway switch described in any of the implementations above.

The multiway switch includes eight T ports and four P ports. The antenna system includes four antennas corresponding to the four P ports. The eight T ports include four first T ports and four second T ports. Each of the four first T ports is coupled with all of the four P ports and the four first T ports support only a transmission function. The four second T ports are coupled with the four P ports in one-to-one correspondence and the four second T ports support only a reception function. Each of the four P ports is coupled with a corresponding antenna of the four antennas.

The multiway switch is coupled with the radio frequency circuit and the antenna system and supports a preset function of transmitting an SRS through the four antennas in turn.

Figure 13:
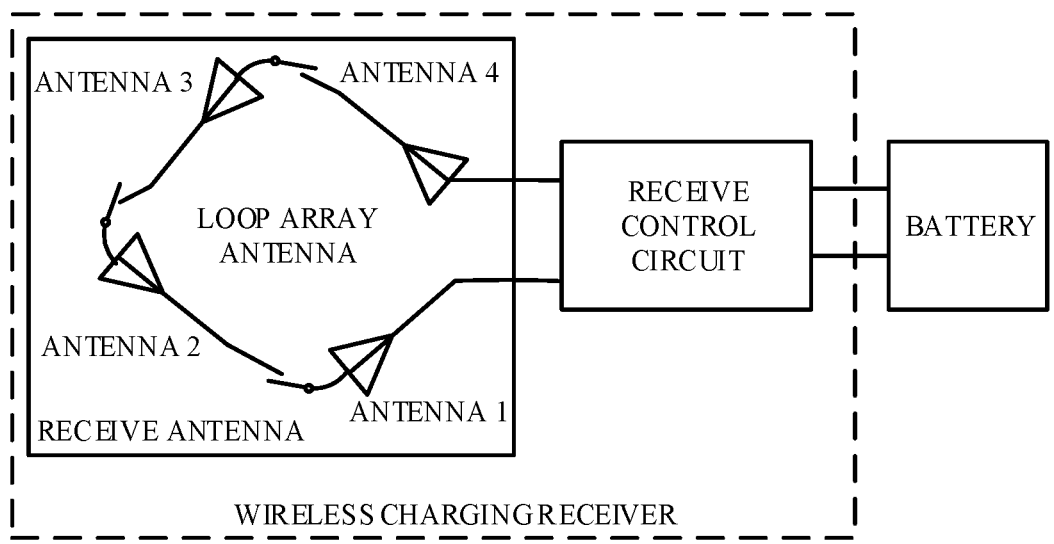
FIG. 13 is a schematic diagram illustrating a wireless charging receiver for multiplexing an antenna of a wireless communication device according to an implementation of the disclosure.

In addition, as illustrated in FIG. 13, the four antennas in the antenna system described in the implementations of the disclosure can also be multiplexed by a wireless charging receiver of the wireless communication device 100. The wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to charge a battery. The receive control circuit can dynamically adjust a frequency of the loop array antenna and match the frequency of the loop array antenna with frequencies of the transmit antennas of the wireless charging transmitter to achieve paired charging. Alternatively, the receive control circuit interacts with the wireless charging transmitter in real time on a frequency change range to implement an "exclusive encryption" wireless charging mode.

The receive antenna may be an antenna include at least one of the four antennas (in the case of multiple antennas, the multiple antennas are strobed via switches).

Figure 14:
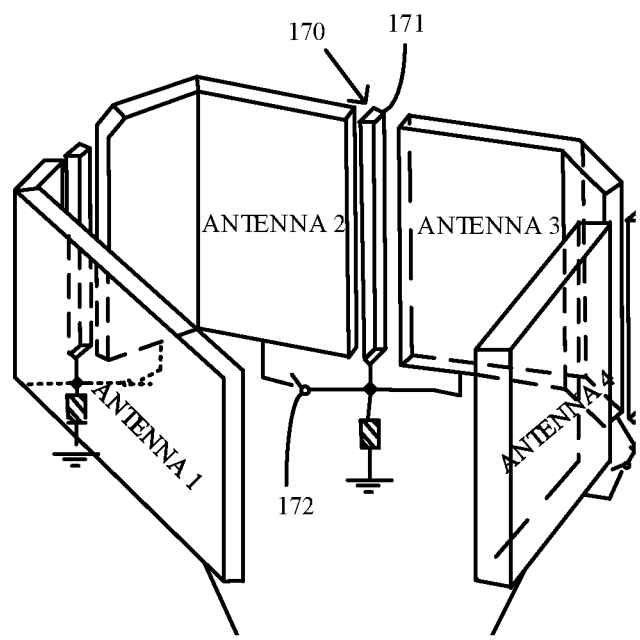
FIG. 14 is a schematic structural diagram illustrating a loop array antenna including four antennas according to an implementation of the disclosure.

For example, as illustrated in FIG. 14, the receive antenna is a loop array antenna including the four antennas described above. The four antennas include antenna 1, antenna 2, antenna 3, and antenna 4. Antenna 1 and antenna 4 are operable at both an LTE frequency band and a 5G NR frequency band, while antenna 2 and antenna 3 are only operable at the 5G NR frequency band. A port of antenna 1 and a port of antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The wireless communication device 100 can conduct the switch 172 of each gate circuit 170 in a wireless charging mode to form a loop array antenna to receive energy. By adding the spacers 171 among the antennas, the gate circuit 170 can reduce mutual coupling among the multiple antennas of the wireless communication device 100 in a normal communication mode, improve isolation among the multiple antennas, and optimize performance of the antennas. On the other hand, the multiple antennas can be coupled in series to form the loop array antenna through the switches 172, so as to better match the transmit antennas to transfer energy. Furthermore, since antenna 1 and antenna 4 have capabilities stronger than that of antenna 2 and antenna 3, the loop array antenna thus arranged can reduce energy loss in transmission as much as possible.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multiway switch, comprising:
eight T ports and four P ports;
the eight T ports comprising four first T ports and each of the four first T ports being coupled with all of the four P ports; the four first T ports supporting only a transmission function;
the multiway switch being configured to be coupled with a radio frequency circuit and an antenna system of a wireless communication device operable in a dual-frequency dual-transmit mode, to implement a preset function of the wireless communication device, the antenna system comprising four antennas corresponding to the four P ports, and the preset function being a function of transmitting a sounding reference signal (SRS) through the four antennas in turn;
the eight T ports further comprise four second T ports;
the four second T ports are coupled with the four P ports in one-to-one correspondence;
each of the four P ports is configured to be coupled with a corresponding antenna of the four antennas; and
the four second T ports support only a reception function.

2. The multiway switch of claim 1, wherein:
the radio frequency circuit physically comprises two independent circuit modules;
the two independent circuit modules are two first independent circuit modules;
the first independent circuit module comprises two first ports and two second ports;
each first port is coupled with one of the four first T ports; and
each second port is coupled with one of the four second T ports.

3. The multiway switch of claim 2, wherein the first independent circuit module comprises two transmitter circuits and two receiver integrated circuits, wherein
the two transmitter circuits work at different frequency bands;
each transmitter circuit has an output port coupled with one of the two first ports of the first independent circuit module;
each receiver integrated circuit comprises two receiver circuits working at different frequency bands; and
each receiver integrated circuit has an input port coupled with one of the two second ports of the first independent circuit module.

4. The multiway switch of claim 3, wherein:
each receiver integrated circuit comprises two low-noise amplifiers (LNA), two filters, and one switch, wherein the two LNAs comprise a first LNA and a second LNA and the two filters comprise a first filter and a second filter, wherein
the switch has a common port coupled with one second port of an independent circuit module to which the receiver integrated circuit belongs;
the switch has one selection port coupled with an input port of the first filter, the first filter has an output port coupled with an input port of the first LNA, and the first LNA has an output port coupled with a corresponding port of a radio frequency receiver; and
the switch has the other one selection port coupled with an input port of the second filter, the second filter has an output port coupled with an input port of the second LNA, and the second LNA has an output port coupled with a corresponding port of the radio frequency receiver; and
the two transmitter circuits of any independent circuit module comprise two power amplifiers (PA), two filters, and one coupler, wherein the two PAs comprise a first PA and a second PA and the two filters comprise a third filter and a fourth filter, wherein
the first PA has an input port coupled with a corresponding port of a radio frequency transmitter;
the first PA has an output port coupled with an input port of the third filter, the third filter has an output port coupled with a first input port of the coupler, and the coupler has a first output port coupled with one first port of an independent circuit module to which the two transmitter circuits belong; wherein the first input port of the coupler corresponds to the first output port of the coupler;
the second PA has an input port coupled with a corresponding port of the radio frequency transmitter; and the second PA has an output port coupled with an input port of the fourth filter, the fourth filter has an output port coupled with a second input port of the coupler, and the coupler has a second output port coupled with the other one first port of an independent circuit module to which the two transmitter circuits belong, wherein the second input port of the coupler corresponds to the second output port of the coupler.

5. The multiway switch of claim 1, wherein:
the radio frequency circuit physically comprises three independent circuit modules;
the three independent circuit modules comprise two first independent circuit modules and one second independent circuit module;
each first independent circuit module comprises two first ports;
the second independent circuit module comprises four second ports;
each first port is coupled with one of the four first T ports; and
each second port is coupled with one of the four second T ports.

6. The multiway switch of claim 5, wherein:
each first independent circuit module comprises two transmitter circuits, wherein
the two transmitter circuits work at different frequency bands; and
each transmitter circuit has an output port coupled with one of the two first ports of each first independent circuit module; and
the second independent circuit module comprises four receiver integrated circuits, wherein
each receiver integrated circuit comprises two receiver circuits working at different frequency bands; and
each receiver integrated circuit has an input port coupled with one of the four second ports of the third second independent circuit module.

7. The multiway switch of claim 1, wherein:
the radio frequency circuit physically comprises three independent circuit modules;
the three independent circuit modules comprise two first independent circuit modules and one second independent circuit module;
each first independent circuit module comprises two first ports and one second port;
the second independent circuit module comprises two second ports;
each first port is coupled with one of the four first T ports; and
each second port is coupled with one of the four second T ports.

8. The multiway switch of claim 7, wherein:
each first independent circuit module comprises two transmitter circuits and one receiver integrated circuit, wherein
the two transmitter circuits work at different frequency bands;
each transmitter circuit has an output port coupled with one of the two first ports of each first independent circuit module;
the receiver integrated circuit comprises two receiver circuits working at different frequency bands; and
the receiver integrated circuit has an input port coupled with the second port of each first independent circuit module; and
the second independent circuit module comprises two receiver integrated circuits, wherein
each receiver integrated circuit comprises two receiver circuits working at different frequency bands; and
each receiver integrated circuit has an input port coupled with one of the two second ports of the second independent circuit module.

9. The multiway switch of claim 1, wherein:
the radio frequency circuit physically comprises four independent circuit modules;
the four independent circuit modules comprise two first independent circuit modules and two second independent circuit modules;
each first independent circuit module comprises two first ports and one second port;
each second independent circuit module comprises one second port;
each first port is coupled with one of the four first T ports; and
each second port is coupled with one of the four second T ports.

10. The multiway switch of claim 9, wherein:
each first independent circuit module comprises two transmitter circuits and one receiver integrated circuit, wherein
the two transmitter circuits work at different frequency bands;
each transmitter circuit has an output port coupled with one of the two first ports of each first independent circuit module;
the receiver integrated circuit comprises two receiver circuits working at different frequency bands; and
the receiver integrated circuit has an input port coupled with the second port of each first independent circuit module; and
each second independent circuit module comprises one receiver integrated circuit, wherein
the receiver integrated circuit comprises two receiver circuits working at different frequency bands; and
the receiver integrated circuit has an input port coupled with the second port of each second independent circuit module.

11. The multiway switch of claim 1, wherein:
the radio frequency circuit physically comprises four independent circuit modules;
the four independent circuit modules comprise two first independent circuit modules and two second independent circuit modules;
each first independent circuit module comprises two first ports;
each second independent circuit module comprises two second ports;
each first port is coupled with one of the four first T ports; and
each second port is coupled with one of the four second T ports.

12. The multiway switch of claim 11, wherein:
each first independent circuit module comprises two transmitter circuits, wherein
the two transmitter circuits work at different frequency bands; and
each transmitter circuit has an output port coupled with one of the two first ports of each first independent circuit module; and
each second independent circuit module comprise two receiver integrated circuits, wherein
each receiver integrated circuit comprises two receiver circuits working at different frequency bands; and each receiver integrated circuit has an input port coupled with one of the two second ports of each second independent circuit module.

13. The multiway switch of claim 1, wherein:
the radio frequency circuit physically comprises six independent circuit modules;
the six independent circuit modules comprise two first independent circuit modules and four second independent circuit modules;
each first independent circuit module comprises two first ports;
each second independent circuit module comprises one second port;
each first port is coupled with one of the four first T ports; and
each second port is coupled with one of the four second T ports.

14. The multiway switch of claim 13, wherein:
each first independent circuit module comprises two transmitter circuits;
the two transmitter circuits work at different frequency bands;
each transmitter circuit has an output port coupled with one of the two first ports of each first independent circuit module;
each second independent circuit module comprises one receiver integrated circuit;
the receiver integrated circuit comprises two receiver circuits working at different frequency bands; and
the receiver integrated circuit has an input port coupled with the second port of each second independent circuit module.

15. A radio frequency system, comprising:
an antenna system, a radio frequency circuit, and a multiway switch coupled with the radio frequency circuit and the antenna system;
the multiway switch comprising eight T ports and four P ports; the eight T ports comprising four first T ports and each of the four first T ports being coupled with all of the four P ports, the four first T ports supporting only a transmission function;
the antenna system comprising four antennas corresponding to the four P ports;
the multiway switch being configured to implement a preset function of transmitting an SRS through the four antennas in turn;
the eight T ports further comprise four second T ports;
the four second T ports are coupled with the four P ports in one-to-one correspondence;
each of the four P ports is coupled with a corresponding antenna of the four antennas; and
the four second T ports support only a reception function.

16. The radio frequency system of claim 15, wherein:
the four antennas comprise a first antenna, a second antenna, a third antenna, and a fourth antenna, wherein
the first antenna and the fourth antenna are antennas operable at a long term evolution (LTE) frequency band and a fifth generation new radio (5G NR) frequency band; and
the second antenna and the third antenna are antennas only operable at the 5G NR frequency band; and the antenna system further comprises a first combiner and a second combiner, wherein
the first combiner has a first port coupled with the first antenna, a second port coupled with a first receive path in LTE 4×4 multiple-input multiple-output (MIMO) configuration of the wireless communication device, and a third port coupled with a corresponding P port of the multiway switch; and
the second combiner has a first port coupled with the fourth antenna, a second port coupled with a second receive path in the LTE 4×4 MIMO configuration of the wireless communication device, and a third port coupled with a corresponding P port of the multiway switch.

17. The radio frequency system of claim 15, wherein:
the four antennas comprise a first antenna, a second antenna, a third antenna, and a fourth antenna, wherein
the first antenna and the fourth antenna are antennas operable at an LTE frequency band and a 5G NR frequency band; and
the second antenna and the third antenna are antennas only operable at the 5G NR frequency band; and
the antenna system further comprises a first single-pole double-throw (SPDT) switch and a second SPDT switch, wherein
the first SPDT switch has a first port coupled with the first antenna, a second port coupled with a first receive path in LTE 4×4 MIMO configuration of the wireless communication device, and a third port coupled with a corresponding P port of the multiway switch; and
the second SPDT switch has a first port coupled with the fourth antenna, a second port coupled with a second receive path in the LTE 4×4 MIMO configuration of the wireless communication device, and a third port coupled with a corresponding P port of the multiway switch.

18. A wireless communication device, comprising:
an antenna system, a radio frequency transceiver, a radio frequency circuit coupled with the radio frequency transceiver, and a multiway switch coupled with the radio frequency circuit and the antenna system;
the multiway switch comprising eight T ports and four P ports, and the antenna system comprising four antennas corresponding to the four P ports;
the eight T ports comprising four first T ports and four second T ports;
each of the four first T ports being coupled with all of the four P ports and the four first T ports supporting only a transmission function; and
the four second T ports being coupled with the four P ports in one-to-one correspondence and the four second T ports supporting only a reception function, wherein
each of the four P ports is coupled with a corresponding antenna of the four antennas; and
the multiway switch is configured to support a preset function of transmitting an SRS through the four antennas in turn.

* * * * *